US006303069B1

(12) United States Patent
Anhalt et al.

(10) Patent No.: US 6,303,069 B1
(45) Date of Patent: *Oct. 16, 2001

(54) PROCESS FOR THE PRODUCTION OF A POLYMER ALLOY

(75) Inventors: Klaus-Peter Anhalt, Rhumspringe; Jürgen Deinert, Duderstadt, both of (DE)

(73) Assignee: Otto Bock Orthopaedische Industrie Besitz-Und Verwaltungs-Kommanditgesellschaft, Dunderstadt (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/965,421

(22) Filed: Nov. 6, 1997

(30) Foreign Application Priority Data

Nov. 7, 1996 (DE) ............................................... 196 45 800
Aug. 9, 1997 (DE) ............................................... 197 34 620

(51) Int. Cl.⁷ ............................ B29C 45/00; B29C 45/47
(52) U.S. Cl. ................................. 264/328.1; 264/328.17; 264/331.11; 264/331.13; 264/331.18; 264/331.19; 264/331.21
(58) Field of Search ........................... 264/328.1, 328.17, 264/328.19, 331.12, 331.13, 331.18, 331.19, 331.21, 331.11

(56) References Cited

U.S. PATENT DOCUMENTS

| | | | |
|---|---|---|---|
| 3,431,224 | * | 3/1969 | Goldblum . |
| 4,017,555 | * | 4/1977 | Alvarez . |
| 4,990,557 | * | 2/1991 | Lee ........................................ 524/494 |
| 5,026,776 | * | 6/1991 | Pratt et al. . |
| 5,053,258 | * | 10/1991 | Booze et al. ..................... 264/173.14 |
| 5,130,076 | | 7/1992 | Blatz et al. .......................... 264/540 |
| 5,185,404 | * | 2/1993 | Folsch et al. ................. 264/328.1 X |
| 5,324,779 | * | 6/1994 | Jarrin et al. .............................. 525/57 |
| 5,695,710 | * | 12/1997 | Chen, Sr. et al. .................... 264/532 |
| 5,814,673 | * | 9/1998 | Khait . |

FOREIGN PATENT DOCUMENTS 44 43 153 A1   6/1996  (DE) .

OTHER PUBLICATIONS

Spritzglessen von Thermoplasten; "Spritzaggregat", 1999.
C.P.J.M. Verbraak et al.: "Screw Design in Injection Molding", Polymer Engineering and Science, vol. 29, No. 7, pp. 479–487 (1989).
K. Hausmann: "Recyclate durch Additive erfolgreich aufwerten", Stuttgart, Seite 8–17 (1996).
G.W. Becker et al: Kunststoff–Handbuch 3/2–Munchen; Wein; Hanser–Verlag, Seite 71 (1993).
K. Biederbick et al.: "Polymerlegierungen", Würzburg, Seite 274–281 (1988).
Becker et al., "Kunstoff Handbuch 3/2 Technische Polymerblends" [Plastics Handbook 3/2 Indutrial Polymerblends] Carl Hanser Verlag Munich Vienna 1993, pp. 219–223.

* cited by examiner

Primary Examiner—Leo B. Tentoni
(74) Attorney, Agent, or Firm—Foley & Lardner

(57) ABSTRACT

A process for the production of moldings from a polymer alloy of multiphase morphology, in which the polymer alloy is prepared with the injection molding in one process step. For this, thermoplastically processable polymers which are incompatible or not very compatible with one another are introduced as granules, preferably having a particle size of greater than or equal to 3 mm, into the hopper of an injection molding machine and are subsequently plasticized, mixed thoroughly, and shaped in the injection molding machine; where at least one of the polymers employed is capable chemically, under the injection molding conditions, of association and/or copolymerization with at least one other of the participating polymers. The resulting polymer alloys are not inferior in their properties to corresponding conventionally produced alloys. The moldings are useful in orthopedics.

29 Claims, 2 Drawing Sheets

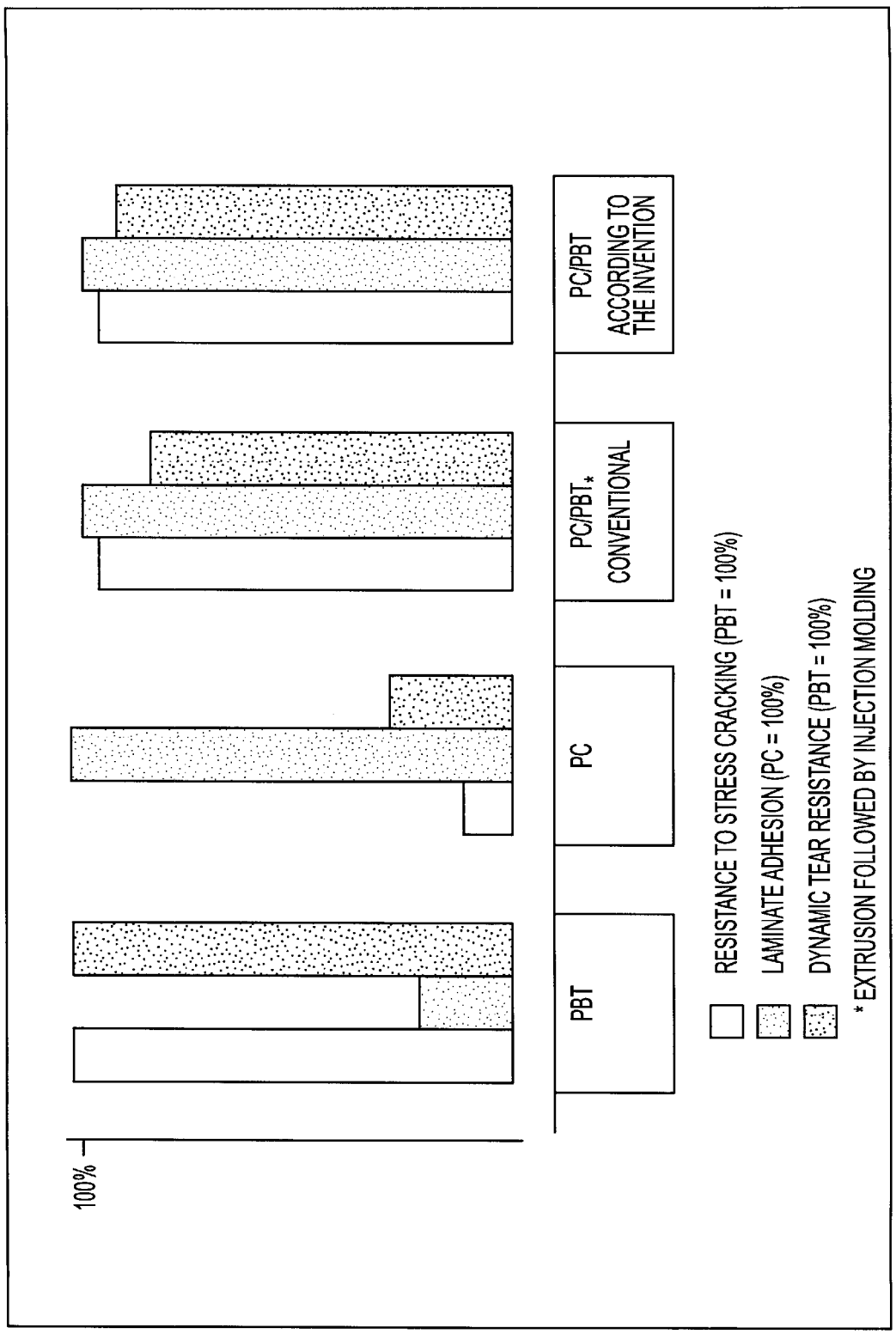

PROCESS FOR THE PRODUCTION OF A POLYMER ALLOY

BACKGROUND OF THE INVENTION

1. Field of the Invention

The invention relates to a process for the preparation of a polymer alloy having multiphase morphology, that includes intimately mixing thermoplastically processable polymers, which are incompatible or not very compatible, in the melt. The invention furthermore relates to a molding produced by this process and the use of such moldings.

2. Description of Related Art

The modification of polymeric materials in an injection molding machine by addition of additives such as dyestuffs or stabilizers, either directly or in masterbatch systems, is known.

U.S. Pat. No. 5,130,076 describes a process for distributing small amounts of an incompatible thermoplastic in finely dispersed form in a thermoplastic matrix that is the main constituent of a polymer blend, by introduction of shear energy such that the incompatibility of the plastics does not lead to a reduction in the mechanical properties. This process is particularly suitable for modification of elastomers, for example, recycled plastic. However, relatively high concentrations of the second blend partner cannot be achieved, since the incompatibility of the components would lead to a decrease in the mechanical properties.

Furthermore, at a high concentration of the incompatible blend polymer, agglomeration and thus phase separation are to be expected during the mold-filling phase, regardless of the mechanical shear energy introduced. This leads to a laminar phase structure. Furthermore, the phase separation causes non-uniform material properties in the molding. This process therefore allows only the preparation of polymer alloys comprising a matrix component and not more than 25% of an incompatible modifying component. Many alloys of industrial interest are therefore not accessible by this process.

DE 44 43 153 describes a process for the preparation of polymer blends in which the components are initially introduced into the apparatus as a powder mixture, and part of the mixing function of the actual processing by injection molding is thus carried out beforehand. The advantage of this process lies in the lower exposure to shear and therefore lesser damage to the components. This effect is particularly advantageous in the production of light-colored moldings. However, this process proves to be expensive if the components are present not as a powder but as granules after the polymerization. Such plastics must first be ground, during which thermo-mechanical damage may occur. To reduce this damage, for example, the plastics can be cooled with liquid nitrogen, but this increases the costs for preparation of the powder.

The difficult flow properties of mixtures of plastics powders in the hopper of the injection molding machine also proves to be a disadvantage. For example, if the two components have different particle sizes, demixing may occur, the consequence of which is non-uniform properties in the moldings. A stirrer in the hopper of the injection molding machine prevents demixing effects and also bridging. However, due to the friction of the particles of the plastics against one another caused by the stirrer, electrical charging may occur, which differs in degree in the various components of the plastics, depending on the electrical conductivity, and can thus lead to different feed properties. Furthermore, such a stirrer increases the overall costs of the process.

Moreover, cleaning work during storage and transportation of powders of plastics, for example when changing materials, are expensive.

SUMMARY OF THE INVENTION

One aim of the present invention is to obtain a polymer alloy by injection moldings having a morphology as finely dispersed as possible with a process of the above-mentioned type. As a result, rough and corrugated surfaces of the moldings and streaking or graining, which may impair the mechanical, dynamic and processing-specific properties, such as, for example, the melt elasticity, are reduced or prevented. The influence of the morphology and therefore of the preparation conditions on the properties of the alloys are described in W. Becker; D. Braun: "Kunststoff Handbuch 3/2 Technische Polymerblends" [Plastics Handbook 3/2 Industrial Polymerblends] (Carl Hanser Verlag Munich Vienna 1993, pages 219, 220).

The invention is therefore based on the object of eliminating the disadvantages described above which still exist in the prior art in processes for the preparation of polymer alloys in combination with processing by injection molding.

Therefore, it is an object of the present invention to provide a process for providing moldings of polymer alloys without the disadvantages of prior processes.

It is also an object of the invention to provide moldings produced by such methods and methods of using such moldings.

In accordance with these objectives, according to the present invention, there is provided a process for the production of a polymer alloy which includes introducing granules of at least two types of thermo-plastically processable polymers, which are incompatible or not very compatible, into the hopper of an injection molding machine, plasticizing, mixing, and shaping the polymers in the injection molding machine, to form a polymer alloy of multiphase morphology, wherein at least one of the polymers has one or more functional groups or chain ends which are capable of association, rearrangement, or other chemical reaction with at least one other polymer of the alloy, so that during the injection molding, association or block copolymer formation occurs between at least a portion of the polymers employed. All polymers rendering a blend, when physically mixed in the molten phase, the mechanical properties like tensile strength, elongation at break, modulus of elasticity etc. of which are not as good as the properties of the respective polymers, are regarded as "not compatible" or "not very compatible".

In accordance with these objectives, there is also provided moldings produced by the process and method of using the moldings.

Further objects, features, and advantages of the present invention will become apparent from the detailed description that follows.

BRIEF DESCRIPTION OF THE DRAWINGS

FIG. 2 shows the comparison of the resistance to stress cracking, adhesion to acrylate resin systems (bondability, coatability) and of the dynamic tear resistance (ISO A 100) between the starting polymers PC and PBT and the alloys PBT/PC produced by the process according to the invention and by the conventional process, i.e. the manufacturing of a blend with an extrusion process followed by injection molding.

DETAILED DESCRIPTION OF PREFERRED EMBODIMENTS

Figure 1:
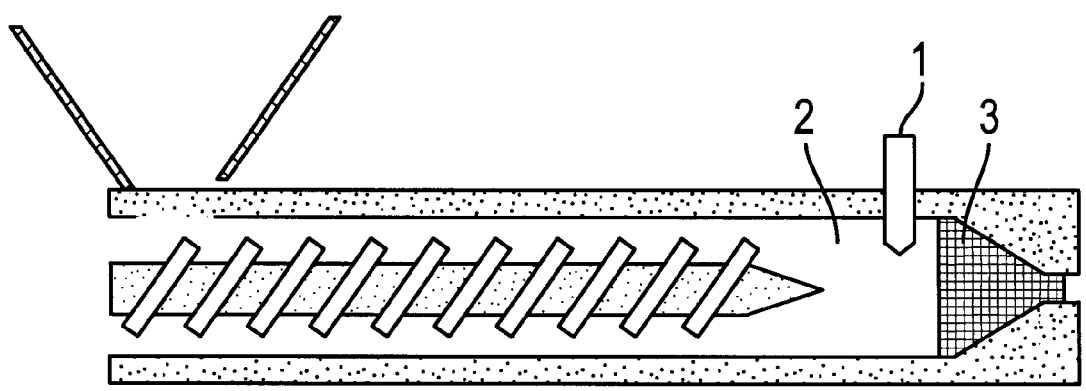
FIG. 1 shows a diagram of a longitudinal section through the plasticizing cylinder of an injection molding machine. The position of the injection nozzle 1 for a liquid inhibitor between the restricted flow space 2 and mixing nozzle 3 is shown.

The process according to the invention includes introducing the thermoplastically processable polymers as granules in any desired ratio (for example see Alloy Mixtures I to III) into the hopper of an injection molding machine, and subsequently plasticizing, thoroughly mixing, and shaping them in the injection molding machine. At least one of the polymers of the alloy to be formed has functional groups or chain ends which are capable of association, rearrangement, or other chemical reaction with at least one other polymer of the alloy, so that under the injection molding conditions, association and/or additional block copolymer formation between the polymers employed as alloy constituents takes place at least to a certain extent.

As a result of the present invention, it is possible to prepare polymer alloys with specifically tailored properties, such as, for example, particular resistance to chemicals or stress cracking, dynamic tear strength, yield stress, elongation at break, impact strength, dimensional stability, flow properties of the polymer melt, or processing temperature range or shrinkage, for the particular desired molding, directly from polymer granules in practically any desired mixing ratios. Materials adapted to the optimum are also made available in this manner for industrially high-performance products, with a low material requirement.

It has been found, surprisingly, that the polymers can be employed in any ratio with respect to one another and as granules, i.e., even having a particle size, i.e. an average particle diameter of '3–25 mm (preferable 3–12 mm), if the polymers have functional groups which allow association, rearrangement, or other chemical reaction among the constituents of the alloy.

Under the injection molding conditions, association and/or additional block copolymer formation then takes place—at least to a certain extent—between the polymers employed as alloy constituents, as a result of which the adhesion of the composite phases in the polymer alloy is optimized and the formation of mixed phases is assisted.

Association in the context of this invention can be, for example, ionic association, which causes cross-linking between the various polymer components. An example of such crosslinking would be the association between a polyamide and a carboxyl ionomer:

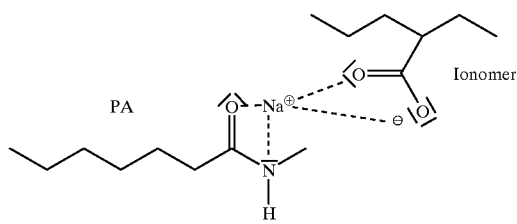

In particular, the function al groups can be, for example, ester, amide, urethane, or anhydride functions. The polymers employed as granules can themselves already be copolymers, preferably block copolymers, or one component can be a copolymer.

To provide ester functions, for example, the following ester-containing polymers can be employed individually or in combination: polyethylene terephthalate (PET), polyethylene naphthalate (PEN), polybutylene terephthalate (PBT), polybutylene naphthalate (PBN), poly-bisphenol A carbonate (PC), liquid crystal polyesters (LCP), polyaryl esters (PAR), polymethyl methacrylate (PMMA), polyvinyl acetate (PVAC), ethylene/vinyl acetate copolymer (EVA), and/or ethylene/ethyl acrylate copolymer (EEA).

To provide amide functions, for example, the following amide-containing polymers can be employed, individually or in combination: polyamide 46 (PA 46), polyamide 6 (PA 6), polyamide 66 (PA 66), polyamide 610 (PA 610), polyamide 11 (PA 11), polyamide 12 (PA 12), polyamide 6-3-T (PA 6-3-T), polyarylamide (PA MXD 6), polyphthalamide (PPA) and/or poly-ether-block amide. Furthermore, at least one of the polymers employed can contain carbonyl functions.

To provide anhydride functions, for example, the following anhydride-containing polymers can be employed, individually or in combination: styrene/maleic anhydride copolymer (S/MAH) or maleic anhydride-containing polypropylene (PP-MAH).

To form the polymer alloy, at least two different polymers are employed, it being possible for the polymers to have different functional groups. When choosing the polymers to be employed, it should be remembered that under the injection molding conditions, which of course are to be varied as such, as is known (melt temperature, rate of throughput, shear rate, and the like), association with or among these functional groups, rearrangement, or other chemical reactions, for example additional block copolymer formation, occurs between the participating partners, as a result of which an improved adhesion of the composite phases is obtained.

If appropriate, a phase mediator and/or a compatibilizing agent can be added to the melt, and this is preferably done as a mixture with the polymer granules, or in the form of a masterbatch. However, pulverulent compatibilizing agents could also be applied in a drum to the granules of at least one of the polymers employed. Any desired phase mediator or catalyst can be used in effective amounts.

Depending on the choice of the polymer components, it may be necessary or advantageous to accelerate the reaction between these by means of a catalyst. As a result, the conversion during the injection molding operation can be increased, if appropriate, to the desired extent. If the copolymerization in the alloy is to take place by transesterification or transamination, for example, a transesterification or transamination catalyst, for example a tetra-alkyl titanate or antimony oxide, can be added, which is preferably done with the addition of the granules. However, any desired catalyst can be used in effective amounts.

The conversion—for example the transesterification or transamination reaction—during the copolymer formation depends on the residence time distribution in the injection molding machine, the melt temperature, and the mechanical shear energy introduced.

Since these process parameters are monitored for optimization of the mold-filling process, the conversion of the copolymer formation can be controlled merely by the nature and the concentration of the catalyst or deactivator. The catalyst or deactivator concentration necessary therefore depends not only on the nature of the polymers employed, on the screw speed, and on the melt temperature, but also on the injection molding machine employed (residence time) and on the molding (shot weight).

The multiphase morphology within the polymer alloy is obtained usually only if the copolymerization or the associative compatibilization does not progress too far. In particular, with long residence times or at high temperatures, it may therefore be advantageous to add a deactivator to the polymer mixture. Deactivators or inhibitors furthermore cause the phase stability necessary for multiple processing or recycling. If they are present in liquid form, for example, they can be injected into the processing unit upstream of a static mixer or upstream of any desired mixing nozzle, into the polymer melt.

Possible deactivators include, for example, diisodecyl phenyl phosphite, a 2-hydroxy-benzophenone derivative or a diacylhydrazine. However, any desired deactivators can be used in effective amounts.

In an embodiment of the invention, further substances may be added, with the granules, as additives, for example release agents, calcium carbonate, talc or mica, or, for example, reinforcing agents, such as, for example, glass fibers, carbon fibers or aramid fibers. The mediators, compatibilizing agents, catalysts and/or other additves can be initially introduced, if present, in a masterbatch. In that case the polymer matrix of the masterbatch has to be compatible with the plastic provided. They can be introduced at any time during the process so that the desired results are achieved.

It is also possible to initially introduce externally formed block copolymers with the alloy constituents in the hopper of the injection molding machine and thus separate in terms of process technology the copolymer formation on the one hand from the alloying and injection molding on the other hand. Simpler process control is an advantage here, although the additional process step must be considered a disadvantage.

Comparison between moldings produced from polymer alloys by conventional methods and by the process according to the invention showed no difference in respect of yield stress, elongation at break, modulus of elasticity, fatigue limit, solubility, and resistance to stress cracking.

Mixing of the polymers employed according to the invention as granules, for example in the hopper of the injection molding machine, has accordingly proved to be sufficient to realize morphologies which ensure an optimum level of chemical and mechanical properties. Mixing of granules is also sufficient for homogeneous material properties. Premixing of the polymers, for example as a powder mixture, can therefore be omitted. In particular, it is not necessary for polymers commercially obtainable as granules to be ground before alloying, which saves additional effort and costs. In spite of the increased melt temperature, the polymer alloys are also processed by the process according to the invention under conditions which are very gentle on the material, since a damaging processing operation is eliminated for the overall process by omitting the prior separate alloying step. As a result of the omission of the separate alloying process, the process is very inexpensive.

On the basis of the optimized adhesion of the compsite phases, the alloying constituents can furthermore be employed in any desired ratio with respect to one another. Moreover, because of the high composite adhesion between the phases of the polymer alloys prepared by the process according to the invention, the introduction of energy required is reduced such that conventional injection molding screws can be employed. This effect saves changing the screw when changing over a product and thus further reduces the costs of the process.

Any desired injection molding machine can be used. For example, the conventinal injection molding screw can be a universal screw, which preferably has a length of between 16 and 20 D (16 and 20 times the diameter), where approximately 50% of the length is assigned to the feed section, 30% of the length to the compression zone and 20% to the discharge zone. No additional shear or mixing elements are necessary. The compression should be in the range between 1,5 and 3. Conventional injection molding conditions can be as follows:

injection rate: 10–16 cm$^3$/s injection pressure: 1000–2000 bar max. holding pressure: 500–1000 bar holding pressure time: 2–20s back pressure: 60–120 bar Costs can furthermore be saved if the components are not initially introduced as a mixture of granules, but a divided hopper is used.

By the process according to the invention, the product-specific adjustment of the nature and concentration of the alloy constituents is possible for each individual injection molding, which allows the production of individual components having a specific design of properties. Precisely as a result of this, the use of the moldings produced by the process according to the invention is particularly suitable for prostheses in orthopedics.

Examples of polymer mixtures from which moldings can be produced by the process according to the invention are given below. These examples are only for illustrative purposes, and do not limit the scope of the invention.

| ALLOY MIXTURE I | Recipe | |
|---|---|---|
| Polymer 1 | PA | 70% by weight |
| Polymer 2 | PP-MAH | 28.5% by weight |
| Catalyst | | |
| Deactivator | | |
| Masterbatch | PA, 50% metal iodide pigments | 1.5% by weight |
| Melt temperature | | 240–260° C. |
| Mean residence time | | 4–8 minutes |
| Injection molding | shaft attachment | |
| Shot weight | | 220 g |
| Polymer 1: PA | | |
| Polymer 2: PP-MAH | | |

-continued

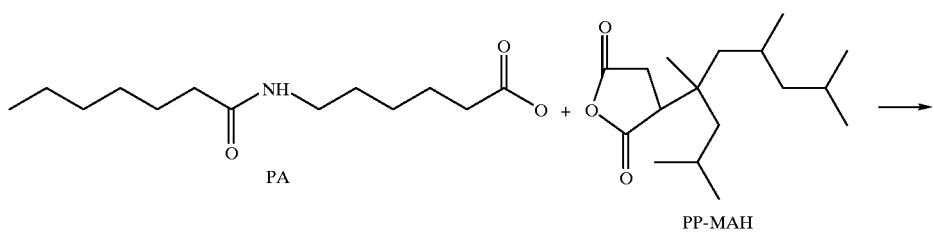

PA    PP-MAH

PP-MAH

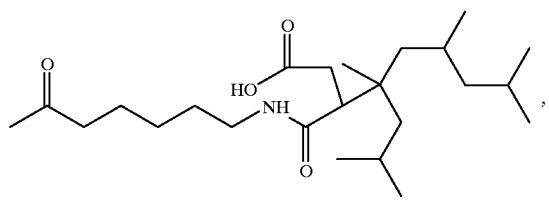

| ALLOY MIXTURE III | Recipe | |
|---|---|---|
| Polymer 1 | PBT | 49.5% by weight |
| Polymer 2 | PC | 49.5% by weight |
| Catalyst | tetra-alkyl titanate | 0.4% by weight |
| Deactivator | trilauryl phosphite | 0.6% by weight |
| Melt temperature | | 250–270° C. |
| Mean residence time | | 2.5–5 minutes |
| Injection molding | tension bar | |
| Shot weight: | | 11 g |
| Polymer 1: PBT | | |
| Polymer 2: PC | | |

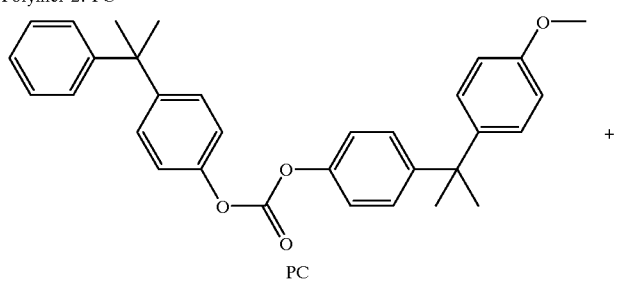

PC

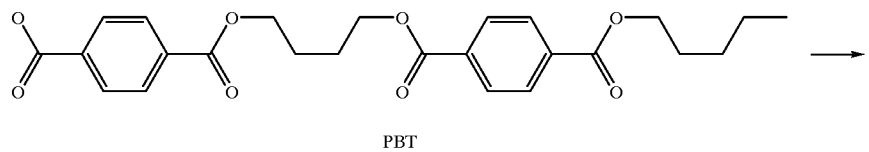

PBT

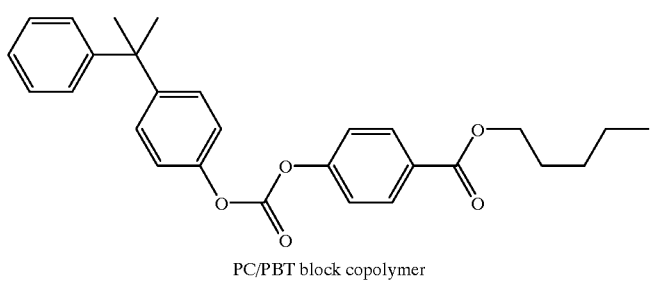

PC/PBT block copolymer

| ALLOY MIXTURE III | Recipe | |
|---|---|---|
| Polymer 1 | PET | 75% by weight |
| Polymer 2 | EVA | 23% by weight |
| Catalyst | antimony oxide | 0.8% by weight |
| Deactivator | oxalic acid dihydrazide | 1.2% by weight |

-continued

| | | |
|---|---|---|
| Melt temperature | | 280–290° C. |
| Mean residence time | | 3–7 minutes |
| Injection molding | knee fitting | |
| Shot weight | | 165 g |
| Polymer 1: PET | | |
| Polymer 2: EVA | | |

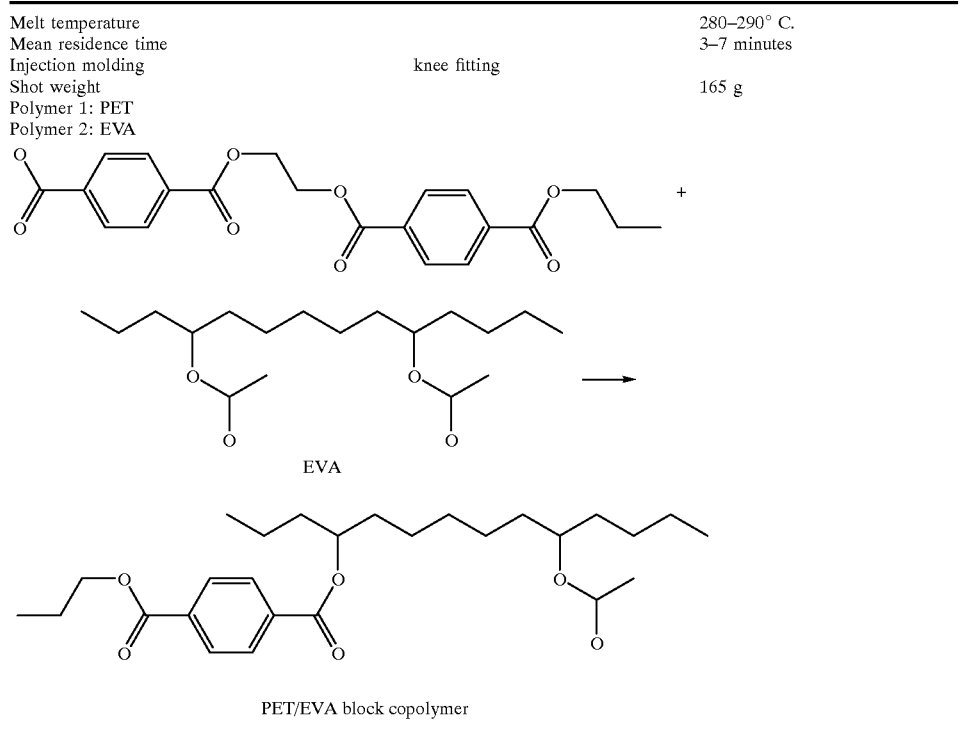

FIG. 1 shows a diagram of a longitudinal section through the plasticizing cylinder of an injection molding machine. The position of the injection nozzle 1 for a liquid inhibitor between the restricted flow space 2 and mixing nozzle 3 is shown.

FIG. 2 shows the comparison of the resistance to stress cracking, adhesion to acrylate resin systems (bondability, coatability) and of the dynamic tear resistance (ISO A 100) between the starting polymers PC and PBT and the alloy mixture II, and the alloys PBT/PC produced by the process according to the invention and by the conventional process.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A process for the production of a polymer alloy and for injection molding the polymer alloy in an injection molding machine having a hopper, a cylinder and a mold, which comprises:

introducing granules of at least two types of thermoplastically processable polymers, which are incompatible, into the hopper of the injection molding machine, plasticizing and mixing the at least two incompatible polymers in the cylinder of the injection molding machine wherein contents of the cylinder consist essentially of a screw, to form a polymer alloy of multiphase morphology as finely dispersed as possible, and shaping the polymer alloy in the injection molding machine, wherein at least one of the at least two incompatible polymers has one or more functional groups or chain ends which are capable of ionic association, rearrangement, or other chemical reaction with at least one other polymer of the at least two incompatible polymers of the alloy, so that at least in the cylinder of the injection molding machine, ionic association or block copolymer formation occurs between at least a portion of the at least two incompatible polymers employed.

2. A process as claimed in claim 1, wherein at least one of the at least two incompatible polymers comprises a copolymer.

3. A process as claimed in claim 1, wherein at least one of the at least two incompatible polymers comprises a block copolymer.

4. A process as claimed in claim 1, wherein at least one of the at least two incompatible polymers contains one or more ester functional groups as said functional groups.

5. A process as claimed in claim 4, wherein the polymer containing ester functional group is selected from the group consisting of polyethylene terephthalate, polyethylene naphthalate, polybutylene terephthalate, polybutylene naphthalate, poly-bisphenol A carbonate, liquid crystal polyesters, polyaryl esters, polymethyl methacrylate, polyvinyl acetate, ethylene/vinyl acetate copolymer, and ethylene/ethyl acrylate copolymer.

6. A process as claimed in claim 1, wherein at least one of the at least two incompatible polymers contains one or more amide functional groups as the functional groups.

7. A process as claimed in claim 6, wherein the polymer that contains amide functional groups is selected from the group consisting of polyamide 46, polyamide 6, polyamide 66, polyamide 610, polyamide 11, polyamide 12, polyamide 6-3-T, polyarylamide, polyphthalamide, and poly-ether-block amide.

8. A process for the production of a polymer alloy and for injection molding the polymer alloy in an injection molding machine having a hopper, a cylinder and a mold, which comprises:

introducing granules of at least two types of thermoplastically processable polymers, which are incompatible, into the hopper of the injection molding machine, plasticizing and mixing the at least two incompatible polymers in the cylinder of the injection molding machine wherein contents of the cylinder consist essentially of a screw, to form a polymer alloy of multiphase morphology as finely dispersed as possible, and shaping the polymer alloy in the injection molding machine, wherein at least one of the at least two incompatible polymers has one or more functional groups or chain ends which are capable of ionic association, rearrangement, or other chemical reaction with at least one other polymer of the at least two incompatible polymers of the alloy, so that at least in the cylinder of the injection molding machine, ionic association or block copolymer formation occurs between at least a portion of the at least two incompatible polymers employed; and wherein at least one of the at least two incompatible polymers employed contains one or more urethane functional groups as the functional groups.

9. A process as claimed in claim 1, wherein at least one of the at least two incompatible polymers contains one or more anhydride functional groups or carboxyl functional group as the functional groups.

10. A process as claimed in claim 9, wherein the polymer containing the functional group is one or more of styrene/maleic anhydride-copolymer, maleic anhydride-containing polypropylene, or an ionomer.

11. A process as claimed in claim 1, wherein at least three different polymers are employed as the thermoplastically processable polymers.

12. A process for the production of a polymer alloy and for injection molding the polymer alloy in an injection molding machine having a hopper, a cylinder and a mold, which comprises:

introducing granules of at least three types of thermoplastically processable polymers, which are incompatible, into the hopper of the injection molding machine, plasticizing and mixing the at least three incompatible polymers in the cylinder of the injection molding machine wherein contents of the cylinder consist essentially of a screw, to form a polymer alloy of multiphase morphology as finely dispersed as possible, and shaping the polymer alloy in the injection molding machine, wherein at least one of the at least three incompatible polymers has one or more functional groups or chain ends which are capable of ionic association, rearrangement, or other chemical reaction with at least one other polymer of the at least three incompatible polymers of the alloy, so that at least in the cylinder of the injection molding machine, ionic association or block copolymer formation occurs between at least a portion of the at least two incompatible polymers employed; and wherein at least one of the at least three incompatible polymers is an elastomer selected from the group consisting of polybutadiene, ethylene/propylene/diene rubber, polysiloxane, styrene/butadiene copolymer, styrene/butadiene/styrene block terpolymer, acrylate rubber, ABS graft copolymer, and methyl methacrylate/butadiene grafted rubber.

13. A process as claimed in claim 1, wherein a phase mediator or compatibilizing agent is added to the injection molding machine.

14. A process as claimed in claim 1, wherein a catalyst is added to the injection molding machine.

15. A process as claimed in claim 14, wherein the catalyst comprises one or more of a transesterification or transamination catalyst.

16. A process as claimed in claim 15, wherein the catalyst comprises tetra-alkyl titanate or an antimony oxide.

17. A process as claimed in claim 1, wherein a deactivator is added to the injection molding machine.

18. The process as claimed in claim 1, wherein one or more of (I) releasing agent selected from the group consisting of calcium carbonate, talc, and mica; or (II) reinforcing agent selected from the group consisting of glass fibers, carbon fibers and aramid fibers, is added to the injection molding machine.

19. The process as claimed in claim 1, wherein one or more of mediators, compatibilizing agents, catalysts or deactivators are introduced into the injection molding machine in the form of a masterbatch.

20. A process for the production of a polymer alloy and for injection molding the polymer alloy in the injection molding machine having a hopper, a cylinder and a mold, which comprises:

introducing granules of at least two types of thermoplastically processable polymers, which are incompatible, into the hopper of the injection molding machine, plasticizing and mixing the at least two incompatible polymers in the injection molding machine, to form a polymer alloy of multiphase morphology as finely dispersed as possible, and shaping the polymer alloy in the injection molding machine, wherein at least one of the at least two incompatible polymers has one or more functional groups or chain ends which are capable of ionic association, rearrangement, or other chemical reaction with at least one other polymer of the at least two incompatible polymers of the alloy, so that in at least a plasticizing and mixing volume of the injection molding machine, ionic association or block copolymer formation occurs between at least a portion of the at least two incompatible polymers employed; and wherein the injection molding machine includes a universal screw which has a length of between 16 and 20 D, where about 50% of the length is a feed section, about 30% of the length is a compression zone, and about 20% is a discharge zone, the compression of the machine is in the range between 1.5 and 3, and which comprises no additional shear or mixing elements.

21. A process for the production of a polymer alloy and for injection molding the polymer alloy in an injection molding machine having a hopper, a cylinder and a mold, which comprises:

introducing granules of at least two types of thermoplastically processable polymers, which are incompatible, into the hopper of the injection molding machine, plasticizing and mixing the at least two incompatible polymers in the cylinder of the injection molding machine wherein contents of the cylinder consist essentially of a screw, to form a polymer alloy of multiphase morphology as finely dispersed as possible, and shaping the polymer alloy in the injection molding machine, wherein at least one of the at least two incompatible polymers has one or more functional groups or chain ends which are capable of ionic association, rearrangement, or other chemical reaction with at least one other polymer of the at least two incompatible polymers of the alloy, so that at least in the cylinder of the injection molding machine, ionic association or block copolymer formation occurs between at least a portion of the at least two incompatible polymers employed; and wherein one or more of the following are added to the injection molding machine:

a) a catalyst;

b) a deactivator;

c) a releasing agent selected from the group consisting of calcium carbonate, talc and mica; or d) a reinforcing agent selected from the group consisting of glass fiber, carbon fiber and aramid fiber; or wherein one or more of a mediator, compatibilizing agent or catalyst are introduced into the injection molding machine in the form of a masterbatch.

22. A process for the production a polymer alloy and for injection molding the polymer alloy in an injection molding machine having a hopper, a cylinder and a mold, which comprises:

introducing granules of at least two types of thermoplastically processable polymers, which are incompatible, into the hopper of the injection molding machine, adding a deactivator comprising one or more of diisodecyl phenyl phosphite, a 2-hydroxybenzophenone derivative or a diacylhydrazine to the injection molding machine, plasticizing, mixing and shaping the at least two incompatible polymers in the injection molding machine, to form a polymer alloy of multiphase morphology as finely dispersed as possible, wherein at least one of the at least two incompatible polymers has one or more functional groups or chain ends which are capable of ionic association, rearrangement, or other chemical reaction with at least one other polymer of the at least two incompatible polymers of the alloy, so that at least in a plasticizing and mixing volume of the injection molding machine, ionic association or block copolymer formation occurs between at least a portion of the at least two incompatible polymers employed.

23. A process as claimed in claim 1, wherein the cylinder contains a screw and no additional shear or mixing elements.

24. A process as claimed in claim 1, wherein the screw comprises a universal screw.

25. A process as claimed in claim 24, wherein the universal screw comprises a feed section, a compression zone, and a discharge zone.

26. A process as claimed in claim 25, wherein:

about 50% of the length of the screw is the feed section, about 30% of the length of the screw is the compression zone, and about 20% of the length of the screw is the discharge zone; and the compression of the machine is in the range between 1.5 and 3.

27. A process as claimed in claim 1, wherein the granules of the at least two types of thermoplastically processable polymers are introduced in any ratio with respect to one another.

28. A process as claimed in claim 27, wherein the granules of the at least two types of thermoplastically processable polymers are introduced in a ratio of up to 1:1 with respect to one another.

29. A process for the production of a polymer alloy and for injection molding the polymer alloy in an injection molding machine having a hopper, a cylinder and a mold, which comprises:

introducing granules of at least two types of thermoplastically processable polymers, which are incompatible, into the hopper of the injection molding machine, plasticizing and mixing the at least two incompatible polymers in the injection molding machine using a plasticizing and mixing element which consists essentially of a screw, to form a polymer alloy of multiphase morphology as finely dispersed as possible, and shaping the polymer alloy in the injection molding machine, wherein at least one of the at least two incompatible polymers has one or more functional groups or chain ends which are capable of ionic association, rearrangement, or other chemical reaction with at least one other polymer of the at least two incompatible polymers of the alloy, so that in at least a plasticizing and mixing volume of the injection molding machine, ionic association or block copolymer formation occurs between at least a portion of the at least two incompatible polymers employed.

* * * * *